US006243000B1

(12) United States Patent
Tsui

(10) Patent No.: US 6,243,000 B1
(45) Date of Patent: Jun. 5, 2001

(54) WIRELESS ROLLING CODE SECURITY SYSTEM

(76) Inventor: Philip Y. W. Tsui, 3513 Ingram Road., Mississauga, Ontario (CA), L5L 4M4

( * ) Notice: Subject to any disclaimer, the term of this patent is extended or adjusted under 35 U.S.C. 154(b) by 0 days.

(21) Appl. No.: 09/023,393

(22) Filed: Feb. 13, 1998

(51) Int. Cl.[7] .............................. G06F 19/00

(52) U.S. Cl. .............. 340/5.21; 340/5.8; 340/825.69; 340/825.72; 340/825.73; 340/5.21; 340/5.2; 341/174

(58) Field of Search .............. 340/825.31, 825.34, 340/825.69, 825.73, 825.72, 524, 870.11, 539, 5.1, 5.2, 5.8, 5.26; 341/173, 174

(56) References Cited

U.S. PATENT DOCUMENTS

| | | | | |
|---|---|---|---|---|
| Re. 35,364 | * | 10/1996 | Heitschel et al. | 340/825.73 |
| 4,772,876 | * | 9/1988 | Laud | 340/539 |
| 4,885,803 | * | 12/1989 | Hermann et al. | 340/825.72 |
| 5,055,701 | * | 10/1991 | Takeuchi | 340/825.69 |
| 5,563,600 | * | 10/1996 | Miyake | 340/825.34 |
| 5,594,429 | * | 1/1997 | Nakahara | 340/825.69 |
| 5,650,774 | * | 7/1997 | Ze' Ev Drori | 340/825.31 |
| 5,774,064 | * | 6/1998 | Lambropoulos et al. | 340/825.31 |

* cited by examiner

*Primary Examiner*—Brian Zimmerman
*Assistant Examiner*—Yves Dalencourt
(74) *Attorney, Agent, or Firm*—Irell & Manella LLP

(57) ABSTRACT

A processor-based transmitter-receiver system and method in which a receiver receives coded signals from at least two transmitters. A circuit for receiving a first coded signal from a first transmitter and a second coded signal from a second transmitter. Each of the coded signals includes a unique identification code and a variable security code. A memory stores at least two codes, each including a unique identification code and a variable security code. A processor coupled to the circuit and the memory, compares each of the received coded signals with each of the stored sets of codes. The processor generates a valid signal if one of the received coded signals matches one of the stored codes.

21 Claims, 7 Drawing Sheets

WIRELESS ROLLING CODE SECURITY SYSTEM

BACKGROUND OF THE INVENTION

1. Field of the Invention

This invention is directed in general to security systems and in particular, to a wireless security system in which a control unit which operates with a plurality of peripheral devices, is capable of receiving and verifying coded signals from each of the plurality of peripheral devices. The peripheral devices transmit the coded signals using a different data frame pattern during each transmission.

2. Prior Art

Transmitter-receiver controller systems are widely used for remote control and/or actuation of devices or appliances such as garage door openers, gate openers, and security systems. For example, most conventional security systems use a transmitter-receiver combination to monitor selected areas. In such conventional security systems, all the peripheral devices such as sensors, and the control unit operate using the same identification code, so that only those devices belonging to a particular installed security system on the premises can operate with each other. Other devices which operate using a different identification code, would be ignored. In more complicated systems, various groups of peripheral devices may be assigned to different zones, each of which is monitored for quick identification in the event of a security breach.

Such conventional security systems provide several security risks. First, since a single, fixed identification code is utilized, the identification code may be detected by a hostile user, and subsequently used to disarm the control unit. Secondly, since all the peripheral devices operate using the same identification code, back-up or secondary sensors are rendered useless in the event that the control circuitry for the primary sensor is disarmed.

Accordingly, there is a need in the technology for a security system which provides increased security by having a control unit which operates with a number of peripheral device, each having different identification codes which cannot be easily detected. In addition, there is a need for a security system which facilitate the implementation of secondary sensors which can function despite of detection of primary sensors.

SUMMARY OF THE INVENTION

A processor-based transmitter-receiver system and method in which a receiver receives coded signals from at least two transmitters. The receiver comprises a circuit for receiving a first coded signal from a first transmitter and a second coded signal from a second transmitter. Each of the coded signals includes a unique identification code and a variable security code. A memory stores at least two codes, each including a unique identification code and a variable security code. A processor coupled to the circuit and the memory, compares each of the received coded signals with each of the stored sets of codes. The processor generates a valid signal if one of the received coded signals matches one of the stored codes.

DESCRIPTION OF PREFERRED EMBODIMENTS

Figure 1A:
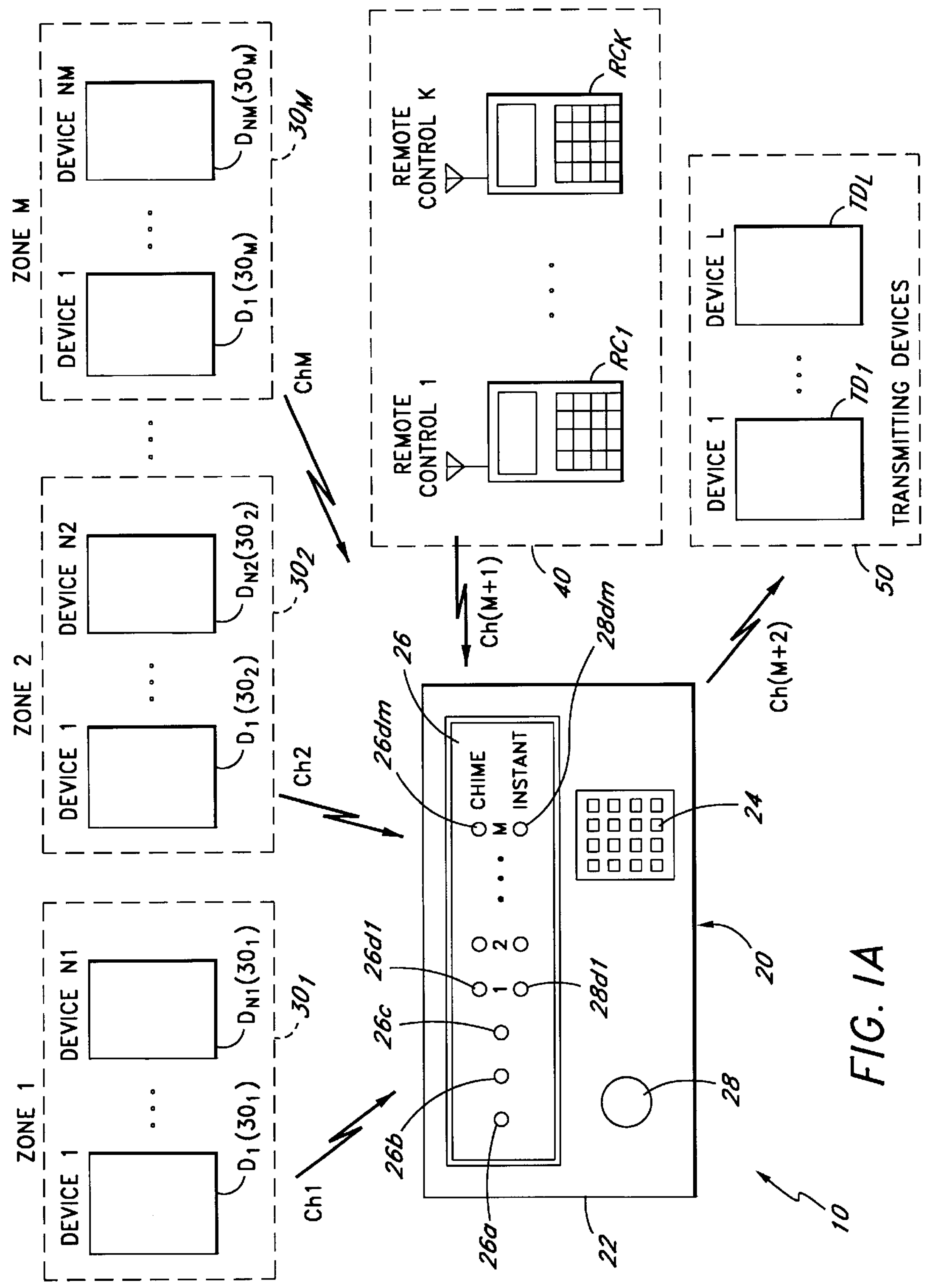
FIG. 1A is a block diagram illustrating one embodiment of the security system of the present invention.

FIG. 1A is a block diagram illustrating one embodiment of the security system of the present invention. The security system 10 comprises a security console 20, a plurality of sets of peripheral devices $D1(30_1)$–$DN1(30_1)$, $D1(30_2)$–$DN2(30_2)$, . . . , $D1(30_M)$–$DNM(30_M)$, each of which is allocated to a zone $30_1$, $30_2$, . . . , $30_M$ respectively, a plurality of remote controllers RC1, . . . RCK (collectively referred to as remote controllers 40), and a plurality of transmitting devices TD1, . . . , TDL (collectively referred to as transmitting devices 50). In one embodiment, the number of peripheral devices $D1(30_1)$–$DN1(30_1)$, $D1(30_2)$–$DN2(30_2)$, . . . , $D1(30_M)$–$DNM(30_M)$ are equal, i.e., N1=N2=NM. However, in alternate embodiments, any desired number of peripheral devices may be assigned to a particular zone $30_1$, $30_2$, . . . , $30_M$. Examples of the peripheral devices include sensors such as motion sensors, door/window contacts, garage door openers, etc.

The security console 20 comprises a housing 22, a keypad 24, a display panel 26 and a opening 28 which facilitates the projection of audio signals. In one embodiment, the housing 22 is made from plastic through an injection-molding process. In one embodiment, the keypad 24 is an alphanumeric keypad. In an alternate embodiment, the keypad 24 is a numeric keypad. The display panel 26 comprises a first light emitting diode (LED) 26*a* which indicates the console is powered up, a second LED 26*b* which indicates that the battery supply is low, a third LED 26*c* which indicates that the console 20 is armed, a first plurality of zone LEDs 26*d*1, . . . , 26*dm* which correspond to the zones $30_1$, . . . , $30_m$, each of which will light up indicating that a chime will sound when a corresponding one of the peripheral devices are activated, and a second plurality of zone LEDs 28*d*1, . . . , 28*dm* which correspond to the zones $30_1$, . . . , $30_m$, each of which will light up indicating that an alarm will sound instantly when an associated one of the peripheral devices is activated. Selection of either the chime mode or the alarm mode may be made during installation of the security system 10 by configuring the microcontroller 100 (See FIG. 2A).

Figure 1B:
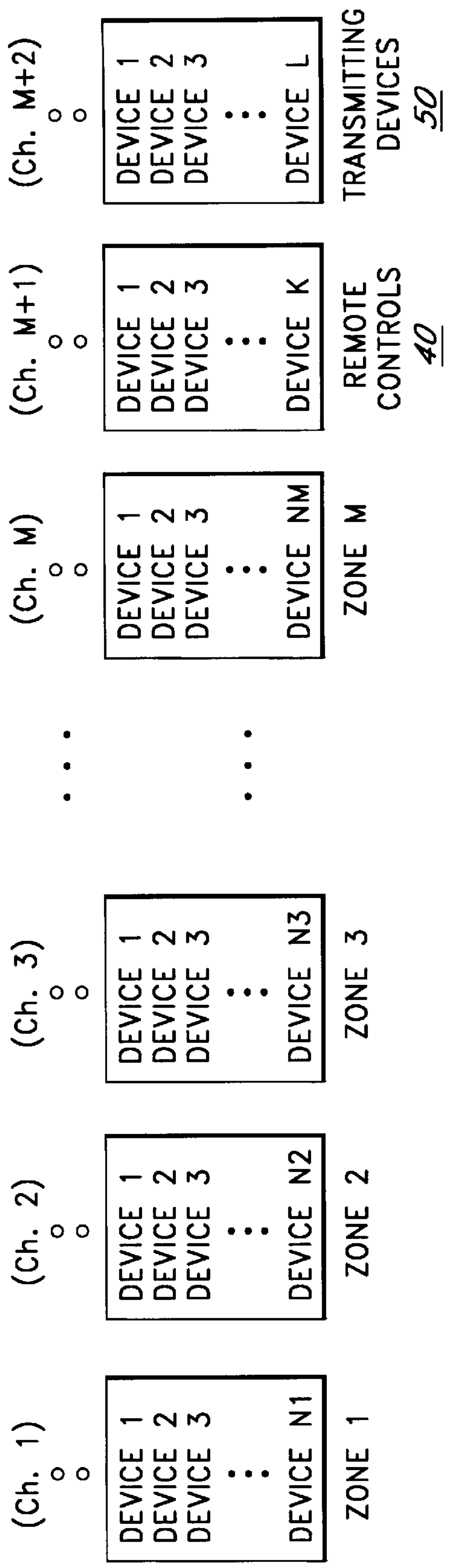
FIG. 1B is a block diagram illustrating one embodiment of the zone/channel organization implemented in the security system of FIG. 1A.

As discussed earlier, each of the peripheral devices $D1(30_1)$–$DN1(30_1)$, $D1(30_2)$–$DN2(30_2)$, . . . , $D1(30_M)$–$DNM(30_M)$, is allocated to a zone $30_1$, $30_2$, . . . , $30_M$ respectively. For example, the user may assign his living room as zone $30_1$, and install various peripheral devices such as electrical or motion sensors to zone $30_1$. FIG. 1B is a block diagram illustrating one embodiment of the zone/channel organization implemented in the security system of FIG. 1A. The security console 20 monitors the devices D1($30_1$)–DN1($30_1$), D1($30_2$)–DN2($30_2$), . . . and/or D1($30_M$)–DNM($30_M$), corresponding to a zone $30_1$, $30_2$, . . . , and/or $30_M$ respectively, via a plurality of channels Ch1, Ch2, . . . , ChM respectively. Two other channels, namely, ChM+1 and ChM+2 are implemented for reception of signals from a plurality of remote controllers 40 and a plurality of transmitting devices 50. One embodiment of the security system 10 of the present invention is described in Appendix A.

Figure 2A:
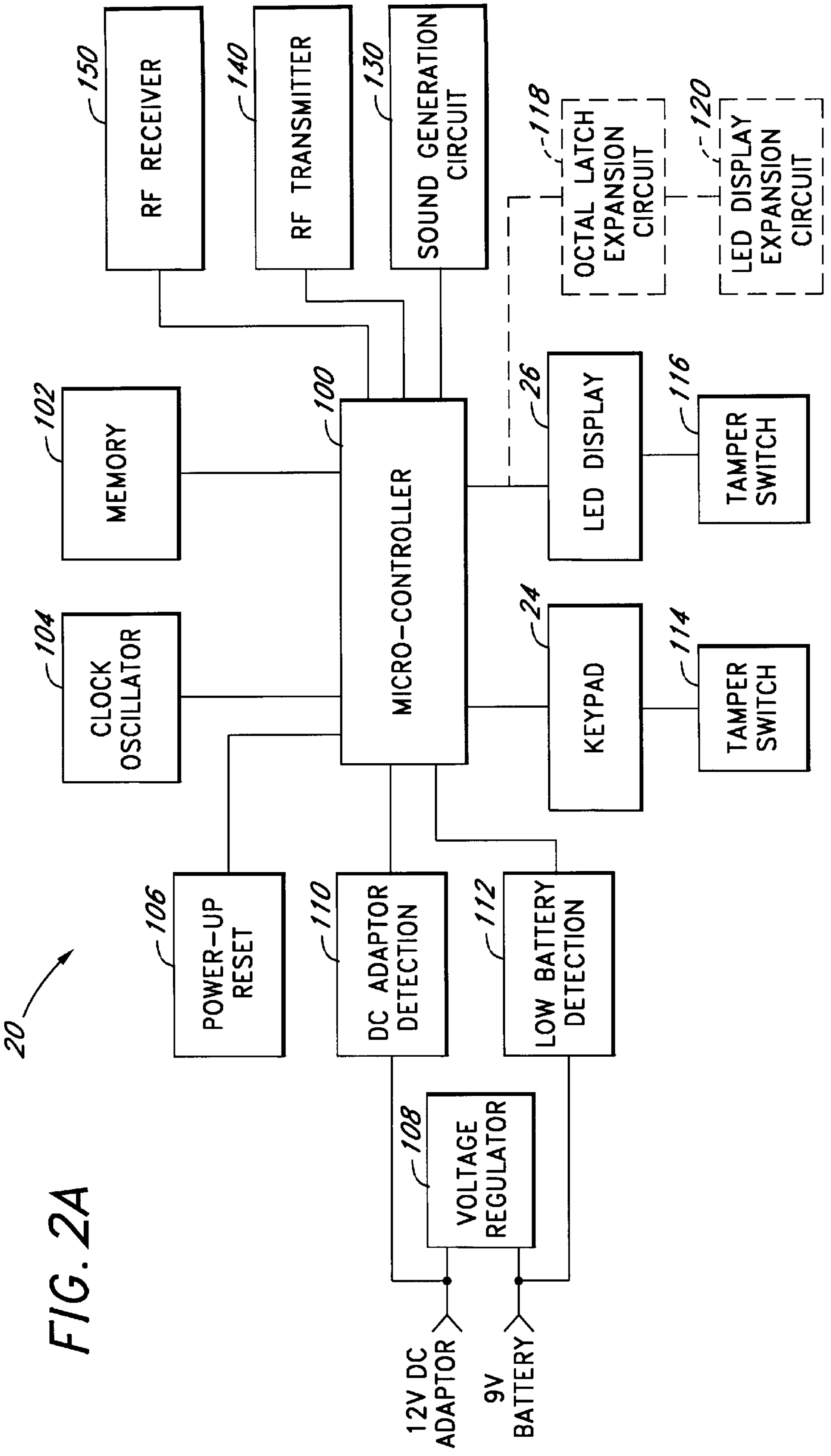
FIG. 2A is a detailed block diagram of one embodiment of the security console 20 of FIG. 1A.

FIG. 2A is a detailed block diagram of one embodiment of the security console 20 of FIG. 1A. The security console 20 comprises a micro-controller 100, memory 102 such as a non-volatile memory, a clock oscillator 104, a power-up reset circuit 106, a voltage regulator 108 which receives current and voltage from either a 12V direct current (DC) source or a 9V battery, a low battery detection circuit 112, the keypad 24 which may be used to enter a password for gaining access to the security console 20, the LEDs on the LED display panel 26, tamper switches 114 and 116 which are coupled to the keypad 24 and LED display panel 26 respectively, an optional Octal Latch Expansion circuit 118, and an optional LED display expansion circuit 120, a sound generation circuit 130, a radio frequency (RF) transmitter 140 and an RF receiver 150. In one embodiment, the micro-controller 100 may be replaced by a processor. The octal latch expansion circuit 118 and the LED display expansion circuit 120 (FIG. 2A) may be implemented in the security console 20 to provide additional storage and input/output capability.

Figure 2B:
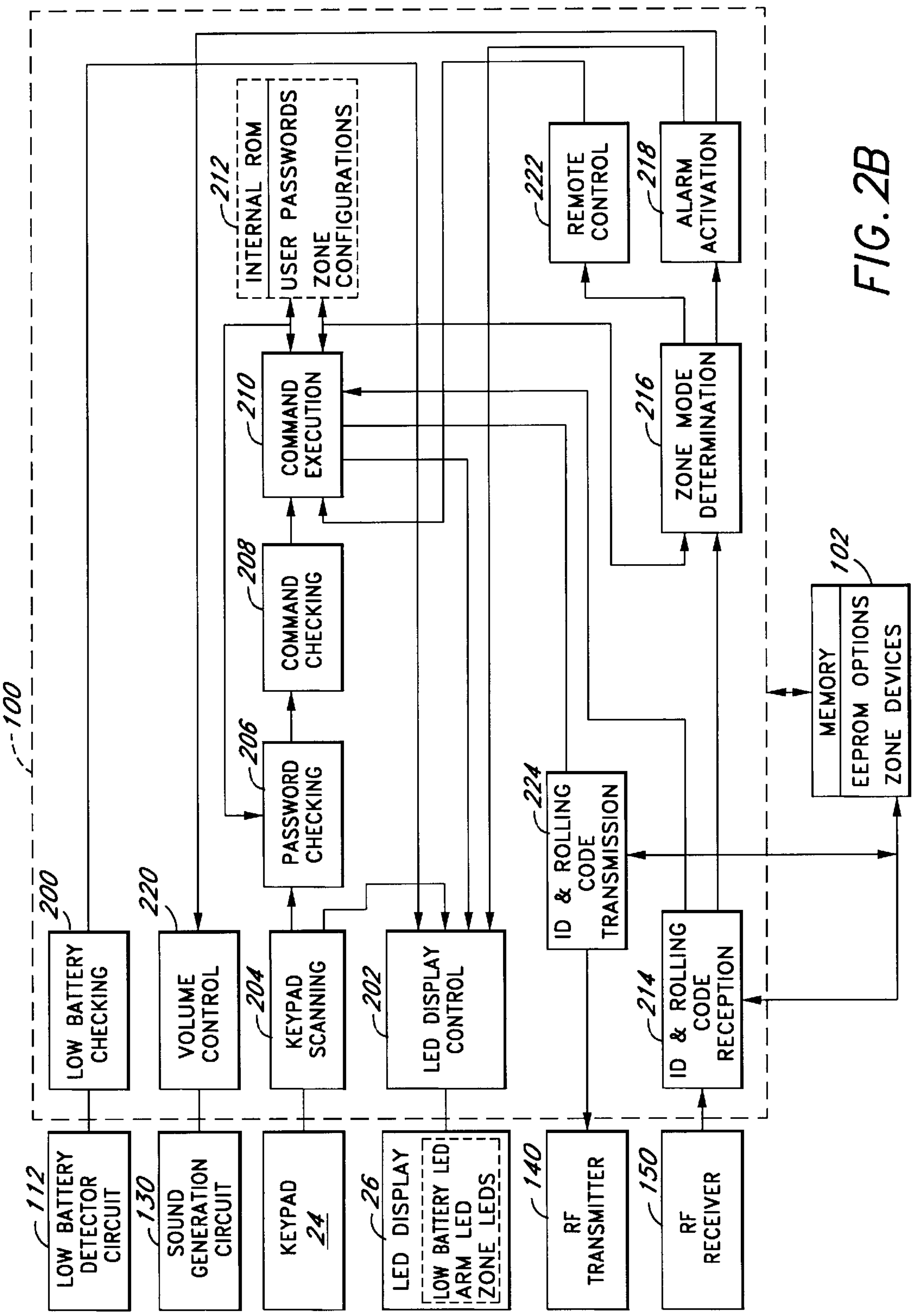
FIG. 2B is one embodiment of a functional block diagram of the micro-controller 100 of FIG. 2A.

FIG. 2B is one embodiment of a functional block diagram of the micro-controller 100 of FIG. 2A. The memory 102 stores information regarding the peripheral devices, e.g. D1($30_1$)–DN1($30_1$), D1($30_2$)–DN2($30_2$), . . . , D1($30_M$)–DNM($30_M$), that are stored in each zone, including the identification codes of each device. In particular, upon activation of each device, a unique identification code and an associated variable security (or rolling) code is transmitted from the device to the security console 100. Memory 102 also stores software which enables the user to assign each device to a particular zone. Such zone assignment or configuration is also stored in memory 102. In one embodiment, each zone corresponds to a particular location of the facility that is being monitored, for example, a first zone may be assigned to include a reception area, while a second zone may be assigned to include a storage room. Alternatively, a first zone may be assigned to include a garage, while a second zone may be assigned to include a bedroom. Upon installing and activating a first device, a signal including a unique identification code and an associated rolling code is transmitted from the first device to the security console. The user may assign the first device to a first monitoring zone to facilitate ease of monitoring. Upon installing a second device in the same general location, a signal including a unique identification code and an associated rolling code is transmitted from the second device to the security console. The user may also assign the second device to the first monitoring zone, to facilitate monitoring of the location of interest. Additional devices for monitoring a selected area may accordingly be assigned to the first monitoring zone.

Likewise, one or more devices may be assigned to one or more additional monitoring zones. In one embodiment, Zone 1 may be assigned to monitor N1 devices, Zone 2 may be assigned to monitor N2 devices, . . . , and Zone M may be assigned to monitor NM devices, where N1, N2 and NM are integers.

The low battery detection circuit 112 provides signals to the micro-controller 100 when the battery level falls below a predetermined level. This signal is monitored by the micro-controller as shown in functional block 200. Upon detection of the predetermined level, the microcontroller 100 sends a command to the LED display 26 to light up the low battery LED 26*b* (see functional block 202). The microcontroller 100 also scans the keypad 24 (functional block 204) to interpret the numerical codes entered via the keypad 24. The microcontroller 100 also determines if the numerical codes entered matches one of the passwords (functional block 206) stored in an internal RAM 212. If so, the microcontroller 100 issues a command that is first verified (functional block 208) and then executed (functional block 210), enabling the user to gain access to the micro-controller 100. The microcontroller 100 also detects the power available provided via either a 12V DC adapter or a battery (see FIG. 2A) and when the security console 100 is powered up, the microcontroller 100 lights up a first light emitting diode (LED) 26*a* which indicates the console is powered up. Upon receiving a user input indicating that the console 20 is armed, the microcontroller 100 lights up a third LED 26*c*. In addition, the microcontroller 100 also controls the status of a first plurality of zone LEDs 26*d*1, . . . , 26*dm* which correspond to the zones 301, . . . , 30*m*, each of which indicate that a chime will sound when an associated one of the peripheral devices are activated, and a second plurality of zone LEDs 28*d*1, . . . , 28*dm* which correspond to the zones 301, . . . , 30*m*, each of which indicate that an alarm will sound instantly when an associated one of the peripheral devices is activated.

As discussed earlier, the microcontroller 100 also receives signals from the RF receiver 150 (functional block 214), which forwards any received signals from the devices in Zone 1, Zone 2, . . . , Zone M (see FIG. 1) to the microcontroller 100. The signals include a unique identification code and a variable security or rolling code. The received signal is processed to determine if it originates from one of the monitored zones, and if so, to determine if it is a valid signal (functional block 216). If so, the micro-controller 100 determines if an alarm should be activated (functional blocks 218 and 220) or if a signal should be transmitted to one of the remotely located transmitting devices 50, which subsequently dials an outside number, indicating that a security violation has occurred (functional blocks 222, 210, 224 and RF transmitter circuit 140). Such a determination may be accomplished by pre-programming the micro-controller 100.

The micro-controller 100 may likewise receive signals from any one of the remote controls 40, each of which includes a unique identification code and a variable security or rolling code. The remote controls 40 may each be carried by an authorized user, for gaining access to the security console 10, for arming or disarming the security console 10 or for actuating one of the peripheral devices of D1($30_1$)–DN1($30_1$), D1($30_2$)–DN2($30_2$), . . . , D1($30_M$)–DNM($30_M$) in the monitored zones. Transmissions initiated by the security console 100 (functional blocks 210, 224) to the transmitting devices 50 are accomplished using a signal having a unique identification code and variable security (or rolling) code in accordance with the present invention.

In one embodiment, the security console 20 includes a housing 22 that encloses the above-described circuitry. The housing (including the keypad 24 and LED display 26) is coupled to tamper switches 114 and 116, via a tamper detection circuit (not shown) which determines if the housing is subject to a predetermined level of pressure that is indicative of attempted or actual tampering or breakage. Upon detection of a level that is at or above a predetermined level of pressure, the microcontroller 100 issues a command to either activate an alarm (functional blocks 210, 216, 218) or to transmit a signal to one of the remotely located transmitting devices 50, which subsequently dials an outside number, indicating that a security violation has occurred (functional blocks 222, 210, 224 and RF transmitter circuit 140). Such a determination may be accomplished by pre-programming the micro-controller 100.

Figure 3A:
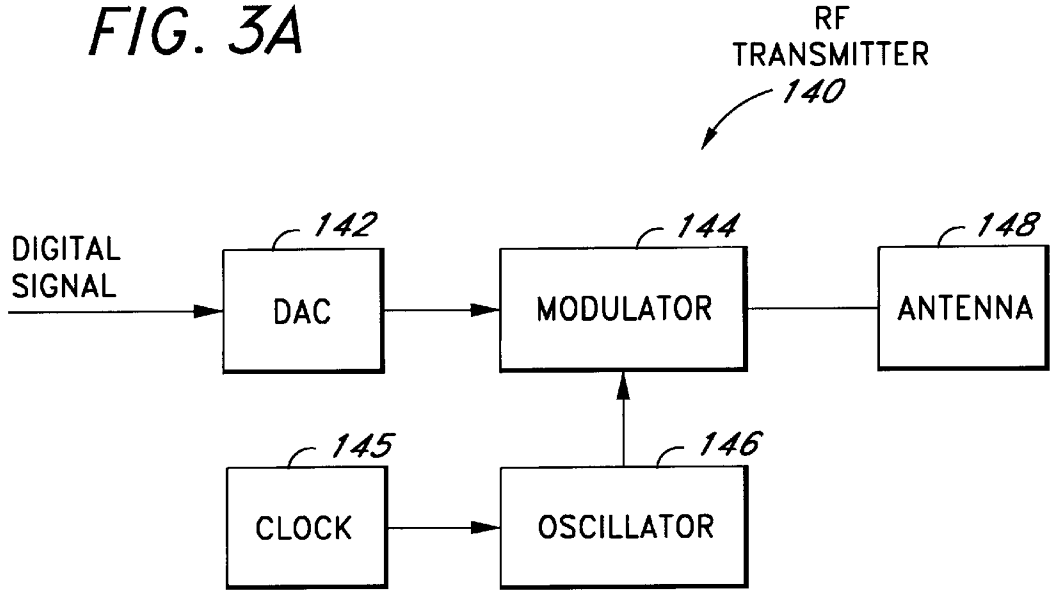
FIG. 3A is a detailed block diagram of one embodiment of the RF Transmitter 140 of FIG. 1A.

FIG. 3A is a detailed block diagram of one embodiment of the RF transmitter 140 of FIG. 1A. The RF transmitter 140 comprises a digital to analog converter 142, which converts the digital signal generated by the microcontroller 100 to an analog signal, a modulator 144, which modulates the analog signal and subsequently provides the modulated analog signal to antenna 148. The modulator 144 receives the carrier frequency from an oscillator 146, which is driven by clock 145.

Figure 3B:
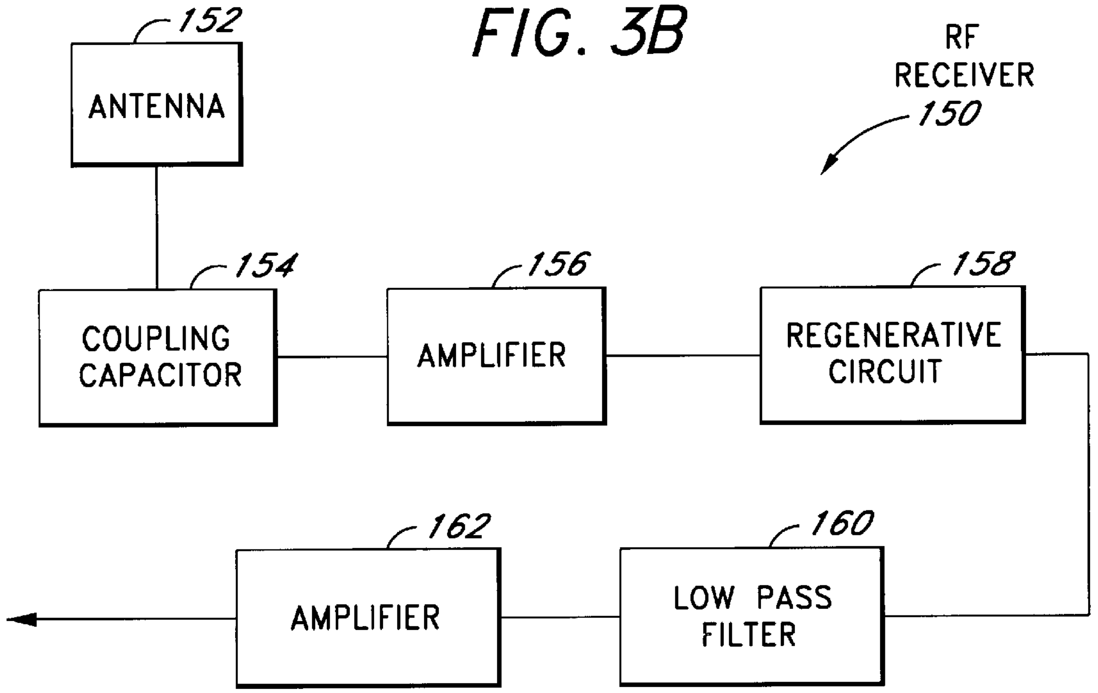
FIG. 3B is a detailed block diagram of one embodiment of the RF Receiver 150 of FIG. 1B.

FIG. 3B is a detailed block diagram of one embodiment of the RF Receiver 150 of FIG. 1B. The RF receiver 150 comprises an antenna 152 for receiving incoming signals, a coupling capacitor 154, an amplifier 156 for amplifying the received signals, a regenerative circuit 158 which performs equalization, timing and decision making processes on the received signals so as to minimize the effects of amplitude and phase distortions on the received signals, a low pass filter 160 for filtering the signals and another amplifier 162 which amplifies the filtered signal. The resulting signal is forwarded to the microcontroller 100.

Figure 4A:
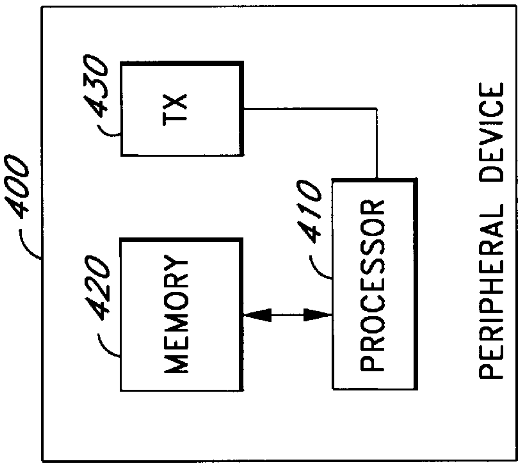
FIG. 4A illustrates one embodiment of any one of the peripheral devices $D1(30_1)$–$DN1(30_1)$, $D1(30_2)$–$DN2(30_2)$, . . . $D1(30_M)$–$DNM(30_M)$ or remote controller 40.
Figure 4B:
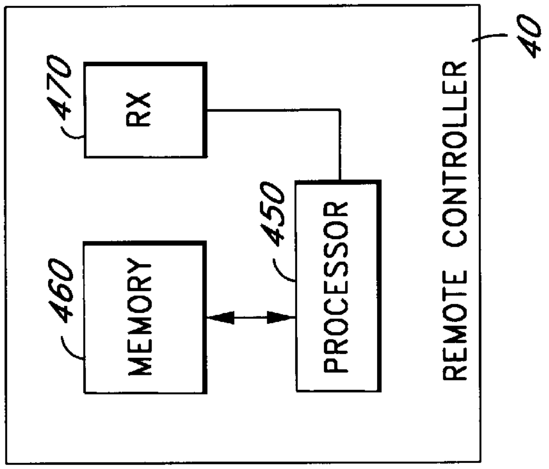
FIG. 4B illustrates one embodiment of any one of the transmitting devices 50.

FIG. 4A illustrates one embodiment of any one of the peripheral devices $D1(30_1)$–$DN1(30_1)$, $D1(30_2)$–$DN2(30_2)$, . . . $D1(30_M)$–$DNM(30_M)$ or remote controller 40. The peripheral device 400 comprises a processor 410, memory 420 and a transmitter 430. FIG. 4B illustrates one embodiment of any one of the transmitting devices 50. The transmitting device 50 comprises a processor 450, memory 460 and a receiver 470.

Figure 4C:
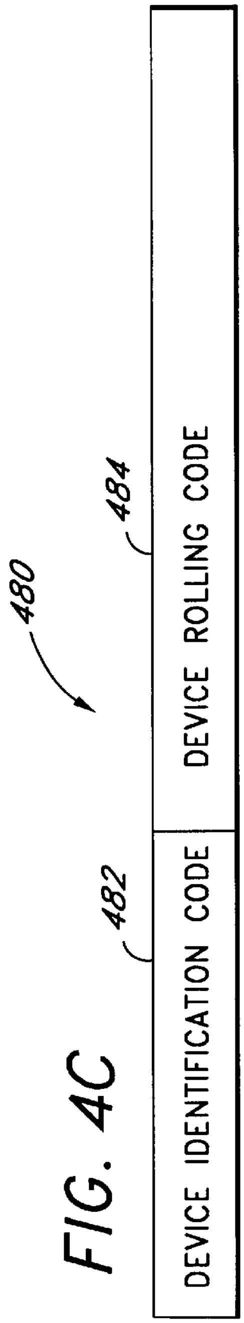
FIG. 4C illustrates the format 480 of the signal transmitted from any of the devices $D1(30_1)$–$DN1(30_1)$, $D1(30_2)$–$DN2(30_2)$, . . . $D1(30_M)$–$DNM(30_M)$, and/or remote controllers 40, to the security console 20.

FIG. 4C illustrates the format 480 of the signal transmitted from any of the devices $D1(30_1)$–$DN1(30_1)$, $D1(30_2)$–$DN2(30_2)$, . . . $D1(30_M)$–$DNM(30_M)$, and/or remote controllers 40, to the security console 20. The signal includes a unique and fixed device identification code 482 and a variable device identification code or rolling code 484. The unique identification code 482 of each of the peripheral devices $D1(30_1)$–$DN1(30_1)$, $D1(30_2)$–$DN2(30_2)$, . . . $D1(30_M)$–$DNM(30_M)$, and/or remote controllers 40 is stored in its memory 420. In addition, software installed in the memory 420 of each of the peripheral devices $D1(30_1)$–$DN1(30_1)$, $D1(30_2)$–$DN2(30_2)$, . . . $D1(30_M)$–$DNM(30_M)$ is executed by the processor 410 during operation of the peripheral device $D1(30_1)$–$DN1(30_1)$, $D1(30_2)$–$DN2(30_2)$, . . . $D1(30_M)$–$DNM(30_M)$ to generate the rolling code 484 in accordance with a predetermined arithmetic equation.

Figure 5:
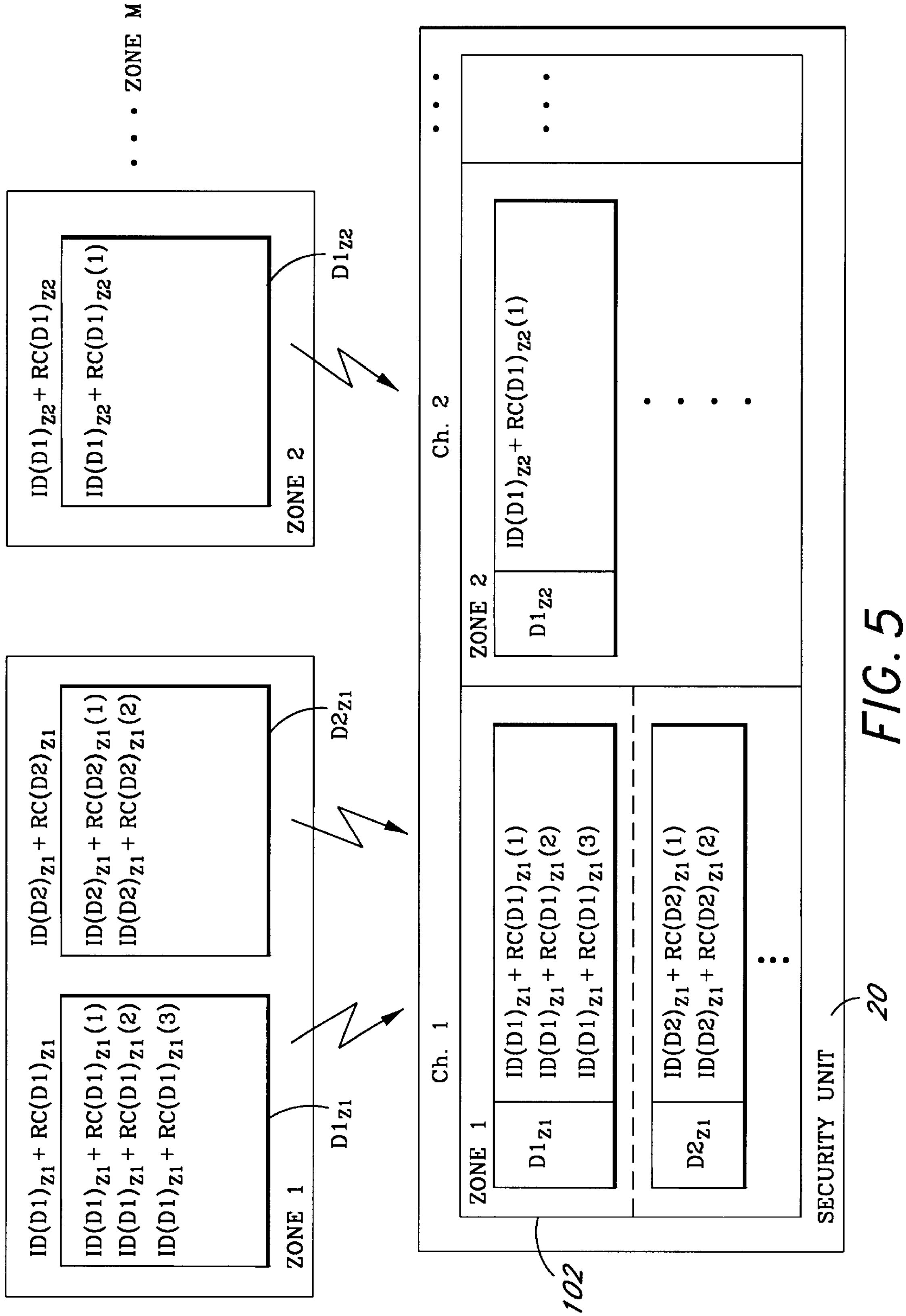
FIG. 5 illustrates one embodiment of the signal identification process implemented in the security system 10 of the present invention.

Software for executing the predetermined arithmetic equation is also installed on the memory 102 (see FIG. 1A) of the security console 20. Upon initially installing and enabling a peripheral device (any of $D1(30_1)$–$DN1(30_1)$, $D1(30_2)$–$DN2(30_2)$, . . . $D1(30_M)$–$DNM(30_M)$ or remote controller 40; for discussion purposes, $D1_{Z1}$ as shown in FIG. 5 will be referred to), the peripheral device emits a signal to the security console 20, which forwards its unique and fixed device identification code 482 and an initial rolling code 484. The device identification code 482 and the initial rolling 484 stored in the memory 102 of the security console. Since the arithmetic equation for generating the initial and subsequent instances of the rolling code 482 is stored in the memory of both the peripheral device $D1_{Z1}$ and the security console 20, the security console 20 will be able to correctly identify subsequent transmissions from the peripheral device $D1_{Z1}$. In addition, since the rolling code 482 is variable, potential violation of the security system 10 of the present invention will be extremely difficult, especially in cases where the rolling code includes a large string of numbers. As a result, the security of the premises will be greatly enhanced.

The security console 20 is configured to separately monitor the identification code and the rolling code sequence of each activated peripheral device $D1(30_1)$–$DN1(30_1)$, $D1(30_2)$–$DN2(30_2)$, . . . $D1(30_M)$–$DNM(30_M)$, and upon receipt of each signal, the microcontroller 100 would generate the expected rolling code sequence associated with a particular identification code (and hence, a particular peripheral device). If there is a match, the received signal will be considered valid. The associated command (e.g., disarm, initiate transmission due to security breach, or to open a door) will then be acknowledged and the associated action will be taken.

FIG. 5 illustrates one embodiment of the signal identification process implemented in the security system 10 of the present invention. As shown, upon activation of the peripheral device $D1_{Z1}$ in zone 1, a signal which includes the identification code $ID(D1)_{Z1}$ and an initial rolling code $RC(D1)_{Z1}(1)$ is transmitted to the security unit 20. As discussed earlier, the initial rolling code $RC(D1)_{Z1}(1)$ and subsequent variations of the rolling code $RC(D1)_{Z1}(n)$ are generated by software installed in memory of the peripheral device $D1_{Z1}$ in accordance with a predetermined arithmetic equation. This software is also installed in the memory 102 of the security console 20.

The identification code $ID(D1)_{Z1}$ and the initial rolling code $RC(D1)_{Z1}(1)$ are received by the security unit 20 and stored in memory 102. Upon detection of motion or upon the breaking of a security contact, the peripheral device $D1_{Z1}$ will transmit a second signal to the security console 20. This second signal from the peripheral device $D1_{Z1}$ will include identification code $ID(D1)_{Z1}$ and a second rolling code $RC(D1)_{Z1}(2)$ generated in accordance with the predetermined arithmetic equation. Since the software for generating the rolling code sequences $RC(D1)_{Z1}(1)$, $RC(D1)_{Z1}(2)$, . . . , $RC(D1)_{Z1}(n)$ is also installed on the security console 20, upon receipt of the second signal, the microcontroller 100 (FIG. 2) first generates the expected rolling code $RC(D1)_{Z1}(2)$ associated with the identification code $ID(D1)_{Z1}$ and then compares the received second signal with the identification code $ID(D1)_{Z1}$ and expected rolling code $RC(D1)_{Z1}(2)$. If there is a match, the second signal will be considered a valid signal. In response, the security console 20 may transmit a signal to one of its transmitting devices 50 (FIG. 1) (such as an emergency dialer), which subsequently sends a signal to one or more outside phones, to alert designated personnel that there is a security breach. Alternatively, the security console 20 may be configured to generate an alarm or a chime using the sound generation circuit 130. In addition, the associated LED 26*d*1 or 28*d*1 will light up, indicating that there is a security breach in zone 1.

Upon detection of a further instance of motion or upon the breaking of a security contact, the peripheral device $D1_{Z1}$ will transmit a third signal to the security console 20. This second signal from the peripheral device $D1_{Z1}$ will include identification code $ID(D1)_{Z1}$ and a third rolling code $RC(D1)_{Z1}(3)$ generated in accordance with the predetermined arithmetic equation. Upon receipt of the third signal, the microcontroller 100 (FIG. 2) generates the expected rolling code $RC(D1)_{Z1}(3)$ associated with the identification code $ID(D1)_{Z1}$ and then compares the received second signal with the identification code $ID(D1)_{Z1}$ and expected rolling code $RC(D1)_{Z1}(3)$. If there is a match, the third signal will be considered a valid signal.

Other installed peripheral devices such as $D2_{Z1}$ in zone 1 and $D1_{Z2}$ in zone 2 operate in a similar manner. However, the generation of signals from either of these peripheral devices $D2_{Z1}$ and $D1_{Z2}$ may be offset in time from that of the peripheral device $D1_{Z1}$. For example, while the peripheral device $D1_{Z1}$ may have transmitted its third signal which includes the identification code $ID(D1)_{Z1}$ and the rolling code $RC(D1)_{Z1}(3)$, the peripheral device $D2_{Z1}$ in zone 1 will be generating its second signal which includes its identification code $ID(D2)_{Z1}$ and the rolling code $RC(D2)_{Z1}(2)$. While the rolling code $RC(D1)_{Z1}(3)$ associated with the peripheral device $D1_{Z1}$ may be generated using the same arithmetic equation as the rolling code $RC(D2)_{Z1}(2)$ associated with $D2_{Z1}$, the rolling codes $RC(D1)_{Z1}(3)$ and $RC(D2)_{Z1}(2)$ are different since they are offset in sequence. In alternate embodiments, different arithmetic equations may be used to generate the rolling codes $RC(D1)_{Z1}$and $RC(D2)_{Z1}$.

In addition, while the peripheral devices $D1_{Z1}$ and $D2_{Z1}$ in zone 1 have generated their third and second signals respectively (and before they generate further signals), the peripheral device $D1_{Z2}$ in zone 2 may be activated to generate its first signal, which includes $ID(D1)_{Z2}$ and its initial rolling code $RC(D1)_{Z2}(1)$. While peripheral devices in two zones have been described, it is contemplated that one or more zones each having at least one peripheral device may be likewise monitored, thus providing a security system that provides increased security.

The above described process may also be implemented using any one of the remote controllers 40. Each remote controller 40 may be used to disarm the security system 10 to facilitate entry to or exit from the premises, or to facilitate movement within a secured area.

Through the use of the present invention, a security system which permits increased security is provided. Since each peripheral device in each monitored zone operates independently of other peripheral devices using a unique identification code and a variable rolling code (which is independently accounted for and updated by the microcontroller in the security console), the identification code and security code of each device cannot be easily captured, duplicated or decrypted by a hostile user. In addition, through the use of multiple sensors, each of which operates using the combination code (identical code/rolling code) transmission format of the present invention, security of the premises may still be ensured and sustained even if one or more primary sensors are violated. Accordingly, enhanced security is provided.

While the preceding description has been directed to particular embodiments, it is understood that those skilled in the art may conceive modifications and/or variations to the specific embodiments and described herein. Any such modifications or variations which fall within the purview of this description are intended to be included therein as well. It is understood that the description herein is intended to be illustrative only and is not intended to limit the scope of the invention. Rather the scope of the invention described herein is limited only by the claims appended hereto.

What is claimed is:

1. In a processor-based transmitter-receiver system in which a receiver receives coded signals from at least two transmitters, said receiver comprising:

a circuit to receive a first coded signal from a first transmitter located in a first zone and a second coded signal from a second transmitter located in a second zone where said circuit is located remotely from said first and second zones, each of said coded signals including a unique identification code and a rolling code, said rolling code of the first coded signal varying with each transmission according to a first arithmetic equation, and said rolling code of the second coded signal varying with each transmission according to a second arithmetic equation that is different from the first arithmetic equation;

a memory to store at least two codes, each including a unique identification code and a rolling code;

a processor coupled to said circuit and said memory, the processor to compare each of said received coded signals with each of said stored sets of codes, said processor generating a valid signal if one of said received coded signals matches one of said stored codes.

2. The receiver of claim 1, wherein said first coded signal is transmitted via a first channel and said second coded signal is transmitted via a second channel.

3. The receiver of claim 1, wherein said circuit further receives a third coded signal from a third transmitter located in said first zone, said third coded signal having a unique identification code and a rolling code.

4. The receiver of claim 3, wherein said circuit further receives a fourth coded signal from a fourth transmitter located in said second zone, said fourth coded signal having a unique identification code and a rolling code.

5. The receiver of claim 1, wherein said memory stores one of said codes in a first memory location corresponding to said first zone, and stores said other one of said codes in a second memory location corresponding to said second zone.

6. The receiver of claim 1, wherein said each of said rolling codes varies in accordance with each transmission of said coded signals, and said first coded signal indicates a condition of a sensor.

7. The receiver of claim 6, wherein said processor generates a predetermined value of each of said variable security codes in accordance with each of said received unique identification code, and said second coded signal enables and disables the receiver.

8. In a processor-based transmitter-receiver system in which a receiver receives coded signals from at least two transmitters, said receiver comprising:

a circuit to receive a first coded signal from a first transmitter and a second coded signal from a second transmitter, each of said coded signals including a unique identification code and a rolling code, said rolling code of the first coded signal varying with each transmission according to a first arithmetic equation, and said rolling code of the second coded signal varying with each transmission according to a second arithmetic equation that is different from the first arithmetic equation;

a memory to store at least two codes, each including a unique identification code and a rolling code;

a processor coupled to said circuit and said memory, the processor to compare each of said received coded signals with each of said stored sets of codes, said processor generating a valid signal if one of said received coded signals matches one of said stored codes; and a transmitting circuit that wirelessly transmits an output signal in response to said valid signal to a transmitting device that is located remotely from said receiver for initiating a connection to indicate that a security violation has occurred, said output signal including a unique identification code and a rolling code.

9. The receiver of claim 8, further comprising an indicator circuit that is coupled to receive said output signal, said indicator circuit generating an indicator signal indicative of said output signal.

10. The receiver of claim 9, wherein said indicator circuit comprises a sound generator circuit.

11. The receiver of claim 9, wherein said indicator circuit is located remotely and is not physically coupled to the receiver.

12. The receiver of claim 1, wherein said receiver further comprises a housing that encloses said circuit, said memory and said processor, said housing being coupled to a tamper circuit that generates a signal upon detection of a predetermined pressure value.

13. A method of verifying coded signals, comprising:

receiving a first coded signal from a first transmitter located in a first zone and a second coded signal from a second transmitter located in a second zone, each of said coded signals including a unique identification code and a rolling code, said rolling code of the first coded signal varying with each transmission according to a first arithmetic equation, and said rolling code of the second coded signal varying with each transmission according to a second arithmetic equation that is different from the first arithmetic equation;

comparing each of said received coded signals with each of two stored codes, each including a unique identification code and a rolling code;

generating a valid signal if one of said received coded signals matches one of said stored codes; and wirelessly transmitting a signal to a remote transmitting device for indicating that a security violation has occurred.

14. The method of claim 13, wherein said first coded signal is transmitted via a first channel and said second coded signal is transmitted via a second channel.

15. The method of claim 13, further comprising receiving a third coded signal from a third transmitter located in said first zone, said third coded signal having a unique identification code and a rolling code.

16. The method of claim 15, further comprising receiving a fourth coded signal from a fourth transmitter located in said second zone, said fourth coded signal having a unique identification code and a rolling code.

17. The method of claim 13, further comprising storing one of said sets of codes in a first memory location corresponding to said first zone, and storing said other one of said sets of codes in a second memory location corresponding to said second zone.

18. The method of claim 13, further comprising varying each of said variable security codes in accordance with each transmission of said coded signals, and wherein said first coded signal indicates a condition of a sensor.

19. The method of claim 13, further comprising generating a predetermined value of each of said variable security codes in accordance with each of said received unique identification code, and wherein said second coded signal enables and disables the receiver.

20. The method of claim 13, wherein said signal includes a unique identification code and a rolling code.

21. The receiver of claim 1, wherein the processor generates one of the at least two codes including an expected variable security code associated with and in response to receiving one of the coded signals, said processor compares said variable security code of said received coded signal with said expected variable security code of said associated code.

* * * * *